United States Patent [19]

Breed

[11] Patent Number: 4,711,466

[45] Date of Patent: Dec. 8, 1987

[54] METHOD AND APPARATUS FOR GAS GENERATOR INITIATION FROM EXTERNAL SENSOR

[75] Inventor: Allen K. Breed, Boonton Township, Morris County, N.J.

[73] Assignee: Breed Corporation, Lincoln Park, N.J.

[21] Appl. No.: 879,413

[22] Filed: Jun. 27, 1986

[51] Int. Cl.[4] .............................................. B60R 21/10
[52] U.S. Cl. .................................................... 280/741
[58] Field of Search ................ 280/735, 741; 102/204; 89/27.13, 27.14

[56] References Cited

U.S. PATENT DOCUMENTS

| 3,859,650 | 1/1975 | Prachar | 280/735 |
| 3,901,530 | 8/1975 | Radke | 280/741 |
| 4,316,874 | 2/1982 | Kasama et al. | 280/741 |

FOREIGN PATENT DOCUMENTS 2150465  4/1973  Fed. Rep. of Germany ...... 280/741

Primary Examiner—John J. Love
Assistant Examiner—Kenneth R. Rice
Attorney, Agent, or Firm—Kane, Dalsimer, Kane, Sullivan and Kurucz

[57] ABSTRACT

A method and apparatus for initiating gas generation in an airbag in which the sensor is external to the gas generating vessel. The apparatus is a sensor which mounts on a toroidal shaped pressure vessel. The sensor activates a percussion primer in vessel when the vehicle decelerates to initiate gas generation without a passage from the vessel to the sensor.

13 Claims, 2 Drawing Figures

METHOD AND APPARATUS FOR GAS GENERATOR INITIATION FROM EXTERNAL SENSOR

BACKGROUND OF THE INVENTION

Field of the Invention

The invention relates to a novel method for initiating a gas generator in an air bag. More particularly the invention relates to a novel method of initiating a gas generator in an air bag from an external sensor.

Brief Description of the Prior Art

Gas generators for air bags are pressure vessels. One problem encountered in building gas generators with the sensor inside relates to the strength of the gas generator. The gas generator must be designed to contain more than a thousand pounds per square inch of pressure.

When the sensor is placed inside the gas generator, it is difficult to support the top and bottom of the gas generator except at the circumference. If the gas generator could be supported near its center then the thickness of the components would decrease and thus the weight of the entire inflator would be less.

The strength of the gas generator becomes even more critical when designing radial flow passenger side inflators which are typically at least twice the size of the driver side inflator. In designing passenger side inflators for compact and subcompact automobiles, space limitations preclude using inflators with increased length. Thus the diamters must be increased, and the top and bottom halves of the inflator must be made considerably stronger. As a result the inflator becomes significantly heavier and more expensive.

The latest concept in designing around this weight problem is to make the inflator in the form of a toroid and to place the sensor in the center of the toroid, outside the gas generator. The problem associated with this design is how to transmit the output from the sensor-/initiator to the inflator.

Present toroid designs have shortcomings. They require a hole or passage for the output of the primer to initiate the gas generator which allows gas to escape from the inflator into the sensor housing. This requires the sensor housing to be constructed to withstand the pressures created by the inflator during operation.

Another toroidal design uses firing pins which impact stab primers which are embedded in the wall of the gas generator. This design also creates a hole in the inflator wall through which gases from the inflator can escape.

SUMMARY OF THE INVENTION

The present invention is a method of initiating gas generation in an airbag inflator for a vehicle from an external sensor which does not require a passage for the output of the sensor to initiate the gas generation. A sensor activates a percussion primer located in a gas generating pressure vessel when the vehicle is in a crash requiring an airbag, without a passage for gas to escape from the gas generator back towards the sensor.

An object of the invention is to provide a method of initiating gas generation which does not require the sensor housing to be constructed to withstand the pressures created by the inflator during operation. As such the sensor can be housed in an inexpensive light weight container.

Another object of the invention is to provide a lightweight gas generating pressure vessel for a passenger side airbag which is relatively inexpensive to manufacture.

Another object of this invention is to provide a construction whereby the sensor is outside of the inflator but axially symmetric with it.

DETAILED DESCRIPTION OF A PREFERRED EMBODIMENT OF THE INVENTION

Figure 1:
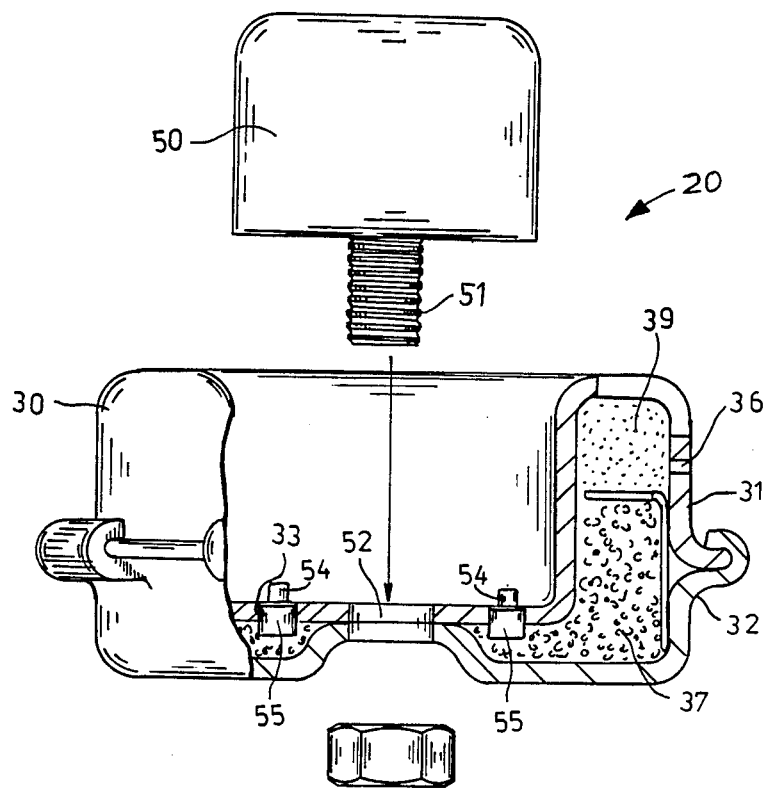
FIG. 1 is a view of the sensor and a gas generator before they are attached for operation. A cutaway reveals the toroid shape of the gas generator and its interior.
Figure 2:
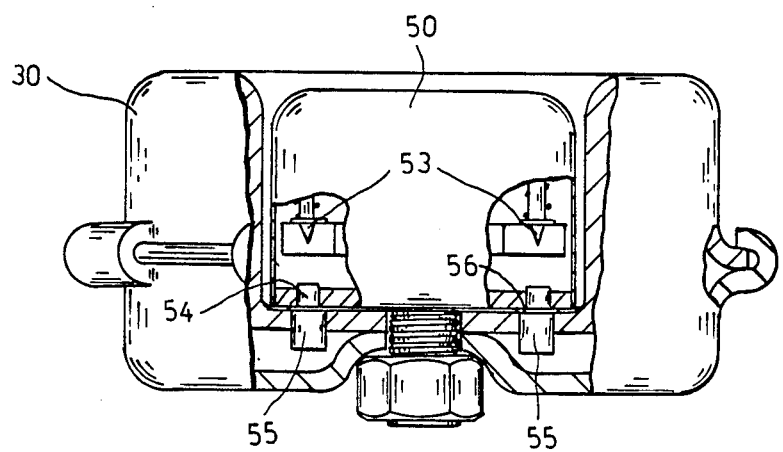
FIG. 2 is a cutaway revealing the sensor/initiator attached to the gas generator.

Referring now to the drawings the inflator 20 is composed of a toroid shaped gas generator 30 and a sensor 50. The sensor 50 is placed in the center of the toroid gas generator outside the gas generator housing.

The gas generator 30 has a lower cup shaped portion 32 and an upper cap 31 which fit together to form a hollow toroid shaped housing. The wall of the upper portion 31 contains a number (usually two) of symmetrically located orifices 33 for receiving percussion primers.

The sensor 50 attaches to the gas generator 30 by a centrally located bolt 51 which passes through an orifice 52 in the gas generator and is bolted into position. The sensor contains firing pins 53 aligned to detonate stab primers 54 which are aligned with the percussion primers 55. The sensor 50 is securely bolted to the gas generator 30. Flange 56 acts to seal the gas generator's chamber so that the gas generated at several thousand pounds per square inch, cannot escape back into the sensor.

In some application, the firing pins could impact the percussion primers directly. In the preferred embodiment shown here, however, the firing pins impact stab primers, which in turn set off the percussion primers. Stab primers require considerably less energy for initiation than do percussion primers. In general, the amount of energy required to initiate a primer determines the force exerted by the firing pin spring. The higher the energy requried, the stronger the spring must be. As the firing pin spring gets stronger, however, the friction which must be overcome by the releasing mechanism also increases and consequently, the sensing mass in the sensor must increase. Since it is highly desirable to keep the size and weight of the airbag system to a minimum, it is preferable to use low energy stab primers. These primers could not be placed in the inflator wall, however, since, when the primer is initiated, gas flows out both ends of the primer creating a hole through which the inflator gases could later flow.

During the operation the firing pins 53 are released in response to a deceleration of the vehicle above a predetermined threshold. The firing pins initiate the primers 54. This in turn initiates the percussion primers 55 located within the pressure vessel which initiates the combustion of the gas generating material 37 inside the pressure vessel 30. A common gas generating material in use today is sodium azide which in conjunction with a metal oxide or other oxident generates nitrogen gas from the azide. The gas passes through filter 39 and inflates the airbag via exit orifice 36.

This invention takes the relatively low energy output of a firing pin spring and amplifies this energy through the use of a stab primer to create the much larger energy required to initiate the percussion primer. In initiating the percussion primer, the outer surface of the primer is deformed, but not penetrated and thus, the gases from the inflator are prevented from flowing back into the sensor.

In the design of gas generators or inflators, the thickness of gas generating material is very important. If this thickness exceeds a critical value, the gas generating reaction can become unstable. This is due to the fact that the rate of gas generation is dependent upon the local pressure where the combustion is taking place. The higher the pressure, the faster the reaction proceeds. The local pressure in the gas generant is somewhat determined by the ease with which the gas products of combustion can flow away from the point where they are being created. Thus, the greater the path that the gases must flow, the greater the flow resistance will be and thus, the greater the pressure will be at the center of the gas generant and thus, the reaction rate at that location will increase. This process can become unstable if the gas generant thickness exceeds the critical value mentioned above. For this reason, as the total capacity for the gas generator increases, the height or diameter of the gas generator must also increase so as not to increase the thickness of the gas generant. This fact has led other inflator designers to use a tubular inflator for the passenger side rather than the cylindrical, toroidal shape described herein. Normally, a toroidal shape might be considered wasteful of space, however, if the sensor is placed in the hole in the toroid, as shown in the present application, the heretofore wasted space is conveniently used. A self-contained module with the sensor separate from the inflator has the further advantage that the sensor which contains the sensitive pyrotechnic primers and firing system can be kept separate from the gas generator until they are installed in the automobile. This greatly simplifies the manufacturing, handling, and shipping of the gas generator and greatly increases the safety of the system until it is installed in the vehicle.

For the purposes of this discussion, a toroidal inflator is one in which the gas generant substantially surrounds a hole. Thus, toroidal inflator would include the following geometries, among others: a doughnut, elliptical toroid; horseshoe, half-doughnut; or the construction illustrated in FIG. 1 where some of the gas generant material extends across one end of the hole.

Thus, in accordance with the above, the several aforementioned objects are effectively attained.

What is claimed is:

1. A method for initiating gas generation in an airbag inflator for a vehicle which comprises:

providing a gas generating pressure vessel having at least one orifice containing a percussion primer, and at least one exit orifice for releasing gas generated within said vessel and said vessel containing a gas generating material;

providing a sensor adapted for mounting on said pressure vessel having an instrumentality to be operated in response to the crash of said vehicle whereupon said instrumentality activates said percussion primer to initate gas generation within said pressure vessel without a passage from which generated pressurized gas can escape from said pressure vessel.

2. The method of claim 1 in which said instrumentality comprises a firing pin adapted to detonate a stab primer which is aligned with said percussion primer.

3. The method of claim 1 in which said gas generating pressure vessel is toroidal shaped and said sensor mounts in the center of the toroid.

4. The method of claim 1 in which said gas generating vessel also contains a filter through which said gas must pass before exiting through said exit orifice.

5. An apparatus for initiating gas generation in an airbag inflator comprising:

a gas generating vessel having at least one orifice containing a percussion primer, and at least one exit orifice for releasing gas generated within said vessel, and said vessel containing a gas generating material;

a sensor mounted on said pressure vessel having an instrumentality to be operated in response to a crash of said vehicle, said percussion primer to initiate gas generation within said pressure vessel without a passage without a passage from which generated pressurized gas can escape from said pressure vessel.

6. The apparatus of claim 5 in which said instrumentality comprises a firing pin adapted to detonate a primer which is aligned with said percussion primer.

7. The apparatus of claim 5 in which said gas generating pressure vessel is toroidal shaped and said sensor mounts in the center of the toroid.

8. The apparatus of claim 5 in which said gas generating vessel also contains a filter through which gas must pass before exiting through said exit orifice.

9. The apparatus of claim 5 in which said gas generating material contains sodium azide.

10. A gas generator and sensor assembly for inflating an airbag comprising:

a toroidally shaped gas generating vessel, a sensor, said sensor having an instrumentality to be operated in response to a crash of said vehicle above a predetermined severity and means for mounting the sensor in the center of the gas generating vessel without creating a passage from which generated pressurized gas can escape from said pressure vessel.

11. The apparatus of claim 10 in which said gas generating vessel also contains a filter through which gas must pass before exiting through said exit orifice.

12. The apparatus of claim 11 in which said gas generating material contains sodium azide.

13. The apparatus of claim 10 in which said instrumentality comprises a firing pin adapted to detonate a stab primer which is aligned with said percussion primer.

* * * * *